(12) United States Patent
Kim et al.

(10) Patent No.: US 6,544,685 B2
(45) Date of Patent: Apr. 8, 2003

(54) ELECTROLYTE FOR LITHIUM SECONDARY BATTERY

(75) Inventors: Jin-Sung Kim, Seoul (KR); Jong-Wook Lee, Cheonan (KR); Kwang-Sik Kim, Cheonan (KR); Young-Gyu Kim, Taejeon (KR); Je-Yun Kim, Taejeon (KR); Jong-Seob Kim, Taejeon (KR)

(73) Assignees: Samsung SDI Co., Ltd., Suwon; KRX; Cheil Industries Inc., Kumi (KR)

( * ) Notice: Subject to any disclaimer, the term of this patent is extended or adjusted under 35 U.S.C. 154(b) by 209 days.

(21) Appl. No.: 09/766,056

(22) Filed: Jan. 19, 2001

(65) Prior Publication Data

US 2001/0018151 A1 Aug. 30, 2001

(30) Foreign Application Priority Data

Jan. 21, 2000 (KR) .......................................... 2000-2946

(51) Int. Cl.⁷ ................................................. H01M 6/04
(52) U.S. Cl. ....................... 429/203; 429/345; 252/62.2
(58) Field of Search ................................ 429/203, 345; 252/62.2

(56) References Cited

FOREIGN PATENT DOCUMENTS

| JP | 6-333596 | 12/1994 |
| JP | 8-64238 | 3/1996 |
| JP | 8-321312 | 12/1996 |
| JP | 9-73918 | 3/1997 |

OTHER PUBLICATIONS

Megahad, et al., Lithium–ion rechargeable batteries, Journal of Power Sources, 51, 1994, pp 79–104 No Month.

Yang, et al., Composition analysis of the passive film on the carbon electrode of a lithium–ion battery with an EC–based electrolyte, Journal of Power Sources, 72, 1998, pp 66–70 No Month.

*Primary Examiner*—Carol Chaney
*Assistant Examiner*—Tracy Dove
(74) *Attorney, Agent, or Firm*—Christie, Parker & Hale, LLP

(57) ABSTRACT

Disclosed is an electrolyte for a lithium secondary battery including a non-aqueous organic solvent and alkylphosphonic acid cyclic anhydride of the following Formula (I)

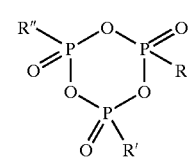

[Formula I]

where R, R', and R" are alkyl groups having 1 to 4 carbon atoms.

3 Claims, No Drawings

ELECTROLYTE FOR LITHIUM SECONDARY BATTERY

CROSS REFERENCE TO RELATED APPLICATION

This application is based on application No. 2000-2946 filed in the Korean Industrial Property Office on Jan. 21, 2000, the content of which is incorporated hereinto by reference.

BACKGROUND OF THE INVENTION (a) Field of the Invention

The present invention relates to an electrolyte for a lithium secondary battery and a lithium secondary battery, and more particularly, to an electrolyte for a lithium secondary battery that undergoes almost no change in thickness when the battery is stored at a high temperature after charging, and a lithium secondary battery including the same.

(b) Description of the Related Art

The use of portable electronic instruments is increasing as electronic equipment gets smaller and lighter due to developments in high-tech electronic industries. Studies on lithium secondary batteries are actively being pursued in accordance with the increased need for a battery having a high energy density for use as a power source in these portable electronic instruments. Lithium-transition metal oxides are used as a positive active material of a lithium secondary battery, and lithium metals, lithium alloys, crystalline or amorphous carbons, or carbon complexes are used as a negative active material of a lithium secondary battery.

An average discharge voltage of a lithium secondary battery is about 3.6 to 3.7 V, which is higher than other alkali batteries, Ni—MH batteries, Ni—Cd batteries, etc. However, an electrolyte which is electrochemically stable in the charge and discharge voltage range of 0 to 4.2 V is required in order to generate such a high driving voltage. Because of this reason, a mixture of non-aqueous carbonate based solvents such as ethylene carbonate, dimethyl carbonate, diethyl carbonate, etc. is used as an electrolyte. However, such an electrolyte has a significantly lower ion conductivity than an aqueous electrolyte solution which is used in a Ni—MH battery or Ni—Cd battery, thereby resulting in the deterioration of battery characteristics during high rate charging and discharging.

During the initial charge of a lithium secondary battery, lithium ions, which are released from a lithium-transition metal oxides positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on a surface of the anode. This film is referred to as a solid electrolyte interface (SEI). The SEI film formed during the initial charging not only prevents the reaction between lithium ions and the carbon negative electrode or other materials during charging and discharging, but also acts as an ion tunnel, allowing the passage of only lithium ions. The ion tunnel prevents the disintegration of the structure of the carbon negative electrode, which is caused that organic solvents in an electrolyte with a high molecular weight make to solvate lithium ion and the solvent and the solvated lithium ion are co-intercalated into the carbon negative electrode.

Once the SEI film is formed, lithium ions are not side reacted with the carbon negative electrode or other materials such that an amount of lithium ions is maintained. That is, carbon of the negative electrode reacts with an electrolyte during the initial charging, thus forming a passivation layer such as a SEI film on the surface of the negative electrode such that the electrolyte is no longer decomposed, and stable charging and discharging are maintained (J. Power Sources, 51(1994), 79–104). Because of these reasons, in the lithium secondary battery, an irreversible formation reaction of the passivation layer dose not occur and a stable cycle life after the initial charging reaction is maintained.

In the case of a thin prismatic battery, there occurs a problem in which gases are generated inside the battery since a carbonate based organic solvent is decomposed during the SEI film forming reaction (J. Power Sources, 72(1998), 66–70). These gases include $H_2$, CO, $CO_2$, $CH_4$, $CH_2$, $C_2H_6$, $C_3H_8$, $C_3H_6$, etc. depending on the type of non-aqueous organic solvent and negative active material used. The thickness of the battery is expanded during charging due to the generation of gas inside the battery, and a passivation layer is slowly disintegrated by electrochemical energy and heat energy which increase with the passage of time when the battery is stored at high temperatures after it is charged. Accordingly, a side reaction in which an exposed surface of the negative electrode reacts with surrounding electrolyte occurs continuously. Furthermore, an internal pressure of the battery is increased with this generation of gas. The increase in the internal pressure induces the deformation of the prismatic battery and lithium polymer battery (PLI). As a result, regional differences in the cohesion between pole plates inside an electrode element (positive and negative electrodes, and separator) of the battery occur, thereby deteriorating the performance and stability of the battery, and making the mounting of the lithium secondary battery set itself difficult.

As a method for solving the internal pressure problem, there is disclosed a method in which the stability of a secondary battery including a non-aqueous electrolyte is improved by mounting a vent or a current breaker for ejecting an internal electrolyte when the internal pressure is increased above a certain level. However, a problem with this method is that mis-operation may be caused by an increase in internal pressure itself.

Furthermore, a method in which the SEI forming reaction is changed by injecting additives into an electrolyte so as to inhibit the increase in internal pressure is known. For example, Japanese Patent Laid-open Publication No. 97-73918A discloses a method in which high temperature storage characteristics of a battery are improved by adding a diphenyl picrylhydrazyl compound of 1% or less to the electrolyte. Japanese Patent Laid-open Publication No. 96-321312A discloses a method in which cycle life and long term storage characteristics are improved using a N-butyl amine group compound of 1 to 20% in an electrolyte. Japanese Patent Laid-open Publication No. 96-64238A discloses a method in which storage characteristics of a battery are improved by $3\times10^{-4}$ to $3\times10^{-3}$ M of calcium salt. Japanese Patent Laid-open Publication No. 94-333596A discloses a method in which storage characteristics of a battery are improved by adding an azo compound to inhibit the reaction between an electrolyte and a negative electrode of the battery.

Such methods as described above for inducing the formation of an appropriate film on a negative electrode surface such as a SEI film by adding a small amount of organic or inorganic materials are used in order to improve the storage characteristics and stability of a battery. However, there are various problems with these methods: the added compound is decomposed or forms an unstable film by interacting with the carbon negative electrode during initial charging and discharging according to inherent electrochemical characteristics, resulting in the deterioration of the ion mobility in an electron; and gas is generated inside the battery such that there is an increase in internal pressure, resulting in the significant worsening of the storage characteristics, stability, cycle life, and capacity of the battery.

SUMMARY OF THE INVENTION

It is an object of the present invention to provide an electrolyte for a lithium secondary battery including 1-alkylphosphonic acid cyclic anhydride which is capable of inhibiting the generation of gas inside the battery caused by the decomposition of a carbonate based organic solvent when the battery is stored at a high temperature after charging.

It is another object of the present invention to provide a lithium secondary battery that undergoes almost no variation in thickness and which obtains improved high temperature capacity storage characteristics when stored at a high temperature after charging.

In order to accomplish the objects of the present invention, the present invention provides an electrolyte for a lithium secondary battery including a non-aqueous solvent and 1-alkylphosphonic acid cyclic anhydride of the following Formula (I).

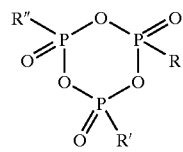

[Formula I]

(where R, R', and R" are alkyl groups having 1 to 4 carbon atoms)

The present invention provides a lithium secondary battery including an electrolyte for a lithium secondary battery comprising a non-aqueous organic solvent and 1-alkylphosphonic acid cyclic anhydride of the Formula (I); a positive electrode including lithium-transition metal oxides as a positive active material; and a negative electrode including carbon, carbon composite, lithium metal, or lithium alloy as a negative active material.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

An electrolyte of the present invention is prepared by adding 1alkylphosphonic acid cyclic anhydride of the following Formula (I) to a non-aqueous carbonate based organic solvent.

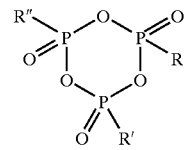

[Formula I]

(where R, R', and R" are alkyl groups having 1 to 4 carbon atoms)

1-alkylphosphonic acid cyclic anhydride is added to a non-aqueous organic solvent in an amount of 0.1 to 10 weight %. The effect of inhibiting the generation of gas inside a battery is not likely when the 1-alkylphosphonic acid cyclic anhydride is used in an amount of less than 0.1 weight %, and initial charge and discharge efficiencies and a cycle life performance of the battery are decreased in accordance with the increase in the amount of compound used when the 1-alkylphosphonic acid cyclic anhydride is used in an amount exceeding 10 weight %.

The 1-alkylphosphonic acid cyclic anhydride inhibits the decomposition of an organic solvent, thereby preventing an increase in the thickness of the battery when the battery is stored at a high temperature after charging.

An organic solvent such as a cyclic or chained carbonate, or a mixture of two or more solvents can be used as a non-aqueous organic solvent in the present invention. Specific examples of the non-aqueous organic solvent include ethylene carbonate (EC), dimethyl carbonate (DMC), diethyl carbonate (DEC), and methylethyl carbonate (MEC).

Lithium hexafluorophosphate ($LiPF_6$), lithium tetrafluoroborate ($LiBF_4$), lithium perchlorate ($LiClO_4$), lithium trifluoromethanesulfonate ($CF_3SO_3Li$), lithium hexafluoroacenate ($LiAsF_6$), or a mixture thereof is added to the electrolyte solution as a supporting electrolytic salt. These act in a battery as a supplying source of lithium ions, making the basic operation of a lithium secondary battery possible.

An electrolyte for a lithium secondary battery of the present invention is stable in the temperature range of −20 to 60° C., thereby maintaining stable characteristics of the battery even at a voltage of 4 V. An electrolyte of the present invention can be applied to all lithium secondary batteries including lithium ion battery, lithium polymer battery, etc.

Lithium-transition metal oxides such as $LiCoO_2$, $LiNiO_2$, $LiMnO_2$, $LiMn_2O_4$, or $LiNi_{1-x-y}Co_xM_yO_2$ (wherein $0 \leq x \leq 1$, $0 \leq y \leq 1$, $0 \leq x+y \leq 1$, and M is a metal such as Al, Sr, Mg, La, etc.) are used as a positive active material, and crystalline or amorphous carbon, carbon complex, lithium metal, or lithium alloy is used as a negative active material in a lithium secondary battery of the present invention.

A lithium secondary battery is manufactured by placing the electrode element into a can or similar container and then injecting a non-aqueous electrolyte to which the 1-alkylphosphonic acid cyclic anhydride is added into the can or container after preparing the electrode element by coating the active material to a suitable thickness and length on a collector of a thin plate or coating the active material itself in a form of film. Subsequently, the coated material or film is compressed up or laminated along with a dielectric separator. Resins film such as polyethylene, polypropylene, etc. can be used as the separator.

The following EXAMPLES further illustrate the present invention in detail but are not to be construed to limit the scope thereof.

EXAMPLES 1 TO 4

Electrolytes of EXAMPLES 1 to 4 were prepared by adding 1 M of $LiPF_6$ to a non-aqueous organic solvent in which ethylene carbonate (EC) and dimethyl carbonate (DMC) are mixed in a volume ratio of 1:1, and then adding 1-propanephosphonic acid cyclic anhydrides as shown in the Table 1 to the solvent.

TABLE 1

| Classification | EXAMPLE 1 | EXAMPLE 2 | EXAMPLE 3 | EXAMPLE 4 |
|---|---|---|---|---|
| Added amount (weight %) | 0.5 | 1.0 | 2.0 | 5.0 |

COMPARATIVE EXAMPLE 1

1 M of $LiPF_6$ was added to a non-aqueous organic solvent in which ethylene carbonate (EC) and dimethyl carbonate (DMC) are mixed in a volume ratio of 1:1.

Manufacturing of lithium secondary batteries

After mixing $LiCoO_2$ as a positive active material, polyvinylidene fluoride (hereinafter referred to as "PVDF") as a binder, and acetylene black as a conductive agent in a weight ratio of 92:4:4, a positive slurry was prepared by dispersing the mixture into N-methyl-2-pyrrolidone. The slurry was coated on 20 μm thick aluminum foil, dried, and compressed, thereby manufacturing a positive electrode. After mixing crystalline artificial graphite as a negative active material with PVDF as a binder in a weight ratio of 92:8, a negative slurry was prepared by dispersing the mixture into N-methyl-2-pyrrolidone. The slurry was coated on a 15 μm thick copper foil, dried, and compressed, thereby manufacturing a negative electrode. Together with a 25 μm thick polyethylene separator, the manufactured electrodes were pressed, then placed into a prismatic can having the dimensions of 30 mm×48 mm×6 mm. Each of the electrolytes of the EXAMPLES 1 to 4 and COMPARATIVE EXAMPLE 1 were injected into the can, thereby completing the manufacture of the batteries.

Thickness variations of the batteries when stored at a high temperature after charging After charging the lithium secondary batteries, which were manufactured by injecting the electrolyte solutions of the EXAMPLES 1 to 4 and COMPARATIVE EXAMPLE 1, in an electric current of 160 mA to a charge voltage of 4.2 V under the condition of CC-CV then allowing the batteries to sit for 1 hour, the batteries were discharged to 2.5 V with an electric current of 160 mA and left to sit for 1 hour. After repeating this procedure 3 times, the batteries were charged in an electric current of 600 mA to a charge voltage of 4.2 V for 2 hours and 30 minutes. The lithium secondary batteries were placed in a chamber of a high temperature of 85° C. for 4 days and the thicknesses of the batteries were measured every 24 hours. The rates of increase in the thicknesses of the batteries are represented in the Table 2.

TABLE 2

| Classification | EXAMPLE 1 | EXAMPLE 2 | EXAMPLE 3 | EXAMPLE 4 | COMPARATIVE EXAMPLE 1 |
|---|---|---|---|---|---|
| 4 hours | 5.9% | 5.0% | 5.0% | 4.2% | 8.8% |
| 24 hours | 9.1% | 7.5% | 5.9% | 5.7% | 11.6% |
| 48 hours | 12.4% | 8.9% | 7.2% | 8.1% | 13.4% |
| 72 hours | 17.2% | 14.5% | 11.4% | 13.1% | 17.4% |
| 96 hours | 21.5% | 20.0% | 15.6% | 18.2% | 22.0% |

It is evident from the Table 2 that the increases in thickness of the lithium secondary batteries into which the electrolyte of EXAMPLES 1 to 4 were injected are substantially less than that of the lithium secondary battery into which the electrolyte of COMPARATIVE EXAMPLE 1 was injected.

Capacity maintenance ratios of the batteries were measured and the results are shown in the following Table 3. That is, the lithium secondary batteries into which electrolyte solutions of EXAMPLES 1 to 4 and COMPARATIVE EXAMPLE 1 were injected were left to sit at a temperature of 85° C. for 4 days after charging. Discharge tests were performed on the batteries to determine the different rates of capacity retention.

TABLE 3

| Classification | EXAMPLE 1 | EXAMPLE 2 | EXAMPLE 3 | EXAMPLE 4 | COMPARATIVE EXAMPLE 1 |
|---|---|---|---|---|---|
| Maintenance ratio of discharge capacity | 82.5% | 84.4% | 85.0% | 85.3% | 82.0% |

Lithium secondary batteries into which electrolyte of EXAMPLES 1 to 4 were injected were shown to have superior capacity maintenance characteristics at a high temperature than the lithium secondary battery into which an electrolyte of COMPARATIVE EXAMPLE 1 was injected.

An electrolyte of the present invention to which 1-alkylphosphonic acid cyclic anhydride is added inhibits the decomposition of a carbonate based organic solvent when a battery is stored at a high temperature after charging. Accordingly, an increase in the thickness of the batteries is inhibited in the case where the electrolyte is applied to a prismatic battery or a lithium polymer battery. Furthermore, a lithium secondary battery using the electrolyte of the present invention has superior capacity maintenance characteristics at a high temperature.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium secondary battery comprising:

a non-aqueous organic solvent; and alkylphosphonic acid cyclic anhydride of the following Formula (I)

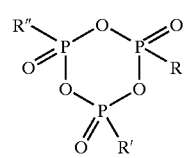

[Formula I]

where R, R', and R" are alkyl groups having 1 to 4 carbon atoms.

2. The electrolyte for a lithium secondary battery according to claim 1, wherein the alkylphosphonic acid cyclic anhydride is added to the non-aqueous organic solvent in an amount of 0.1 to 10 weight %.

3. A lithium secondary battery comprising:

an electrolyte for a lithium secondary battery comprising a non-aqueous organic solvent and alkylphosphonic acid cyclic anhydride of the following Formula (I);

a positive electrode including lithium-transition metal oxides as a positive active material; and a negative electrode including carbon, carbon composite, lithium metal, or lithium alloy as a negative active material

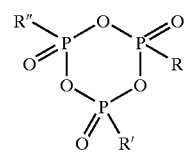

[Formula I]

where R, R', and R" are alkyl groups having 1 to 4 carbon atoms.

* * * * *